US008364087B2

(12) United States Patent
Brisebois et al.

(10) Patent No.: US 8,364,087 B2
(45) Date of Patent: *Jan. 29, 2013

(54) ASYMMETRICAL MULTICARRIER INTERFERENCE AVOIDANCE

(75) Inventors: Arthur Richard Brisebois, Cumming, GA (US); Alain Ohana, Aventura, FL (US); William G. Mansfield, Sugar Hill, GA (US); David Grant Shively, Smyrna, GA (US); Thomas Keathley, Mableton, GA (US); Melvin D. Frerking, Norcross, GA (US); Yung Shirley Choi-Grogan, Issaquah, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/422,608

(22) Filed: Mar. 16, 2012

(65) Prior Publication Data

US 2012/0178373 A1 Jul. 12, 2012

Related U.S. Application Data

(63) Continuation of application No. 12/206,774, filed on Sep. 9, 2008, now Pat. No. 8,155,594.

(51) Int. Cl.
*H04B 1/00* (2006.01)
*H04B 15/00* (2006.01)
(52) U.S. Cl. ................ 455/63.1; 455/62; 455/67.13
(58) Field of Classification Search .......... 455/62, 455/63.1, 67.13
See application file for complete search history.

(56) References Cited

U.S. PATENT DOCUMENTS

| 5,809,395 | A  * | 9/1998 | Hamilton-Piercy et al. ... 725/106 |
| 6,175,550 | B1 | 1/2001 | van Nee |
| 6,356,540 | B1 | 3/2002 | Kojiro |
| 6,791,952 | B2 * | 9/2004 | Lin et al. ........................ 370/281 |
| 7,206,581 | B2 | 4/2007 | Zhang et al. |
| 2005/0181752 | A1 | 8/2005 | Sahota |
| 2008/0037502 | A1 | 2/2008 | Yokoyama |
| 2008/0174470 | A1 | 7/2008 | Lum et al. |
| 2009/0203326 | A1 | 8/2009 | Vesma et al. |

OTHER PUBLICATIONS

3GPP TS 25.308 V7.0.0; Jun. 18, 2009; 3rd Generation Partnership Project; Technical Specification Group Radio Access Network; High Speed Downlink Packet Access (HSDPA); Overall description; Stage 2 (Release 7) 52 pgs.
3GPP TS 25.308 V8.6.0; Jun. 18, 2009; 3rd Generation Partnership Project; Technical Specification Group Radio Access Network; High Speed Downlink Packet Access (HSDPA); Overall description; Stage 2 (Release 8) 63 pgs.

(Continued)

*Primary Examiner* — Tuan H Nguyen
(74) *Attorney, Agent, or Firm* — Turocy & Watson, LLP

(57) ABSTRACT

A system and methods for asymmetrical multicarrier interference avoidance in a communication from a network to a subscriber device. The asymmetrical multicarrier interference avoidance technique comprises measuring signal-to-noise ratio interference values and sorting the measured values into two tables for selecting an anchor and a non-anchor frequency carrier pairs. The system is self-tuning based on changes in the network, the subscriber and the surrounding environment.

20 Claims, 12 Drawing Sheets

OTHER PUBLICATIONS

3GPP TS 25.308 V9.0.0; Jun. 18, 2009; 3rd Generation Partnership Project; Technical Specification Group Radio Access Network; High Speed Downlink Packet Access (HSDPA); Overall description; Stage 2 (Release 9) 65 pgs.
ISR & Written Opinion for International Application No. PCT/US2010/042007, mailing date Jan. 26, 2011, 17 pages.
OA dated Aug. 23, 2011 for U.S. Appl. No. 12/206,774, 15 pages.
OA dated Mar. 15, 2011 for U.S. Appl. No. 12/206,774, 14 pages.
3GPP TS 25.308 V7.8.0 (Sep. 2008);Technical Specification; 3rd Generation Partnership Project; Technical Specification Group Radio Access Network; High Speed Downlink Packet Access (HSDPA); Overall description; Stage 2 (Release 7); 51 pgs.
3GPP TS 25.308 V8.3.0 (Sep. 2008);Technical Specification; 3rd Generation Partnership Project; Technical Specification Group Radio Access Network; High Speed Downlink Packet Access (HSDPA); Overall description; Stage 2 (Release 8) 56 pgs.
3GPP TS 36.300 V8.6.0 (Sep. 2008);Technical Specification;3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8) 137 pgs.
OA dated Apr. 3, 2012 for U.S. Appl. No. 12/508,711, 24 pages.

* cited by examiner

ASYMMETRICAL MULTICARRIER INTERFERENCE AVOIDANCE

CROSS REFERENCE TO RELATED APPLICATIONS

This application is a continuation of U.S. patent application Ser. No. 12/206,774, entitled "ASYMMETRICAL MULTICARRIER INTERFERENCE AVOIDANCE," filed on Sep. 9, 2008. The entirety of the above-referenced U.S. patent application is incorporated herein by reference.

TECHNICAL FIELD

The subject invention relates generally to the telecommunications industry, and more particularly to asymmetrical multicarrier use to reduce interference between bi-directional transmission paths.

BACKGROUND

The mobile telephone industry has been associated with tremendous growth over the last several years. Today's mobile devices (e.g., mobile phones, personal digital assistants (PDAs), etc.) can be utilized as full-service computing mechanisms. For example, many of the most recent and advanced mobile devices can be associated with word processing software, web browsing software, electronic mail software, accounting software, and various other types of software. In general, applications heretofore available only by way of computing devices and/or Internet protocol (IP) based network devices are now available on such mobile devices. This expansion in capability of mobile devices has led to greater bandwidth requirements and an increase in interference among the frequencies available for mobile devices.

Typically, in a Frequency Duplex Division communication system, a frequency carrier pair provides the ability to transmit and receive data in both directions of a communication link. If interference on one path or the other, measured through a signal to noise ratio on this communication path, become too great, the frequency carrier pair is excluded from consideration for future resource allocation or only considered at the cost of severely degraded service, even if the other path is perfectly able to deliver the expected quality of service. As the number of mobile users increases, the consequences of excluding carriers from consideration for resource allocation begins to have a significant effect on the ability to meet the communication needs of the consuming public.

Accordingly, market pressure calls for methods to recapture some of the bandwidth lost because of interference along one direction of the communication path. One element associated with recapturing this bandwidth is the fact that the uplink or downlink paths usually operate in different frequency bands in a multicarrier configuration.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

An asymmetrical multicarrier interference avoidance system and methods that measure the uplink and downlink interference as signal to noise ratio for all the frequency carriers and bands available and intended for inclusion in an asymmetrical multicarrier transmission and reception set. Based on the measured signal to noise interference values, the system selects an anchor frequency and band and non-anchor frequency(s) and band(s) that deliver the desired signal to noise ratio values in the desired directions. In this fashion, the subject invention allows the simultaneous use of available uplink and downlink frequency carriers and bands that meet the required system to noise ratio levels by pairing them with a counterpart uplink or downlink frequency carrier(s) even if the uplink and downlink components are of different frequency bands.

The system and methods are easily understood in terms of a wireless communication system but is not so limited, the system and methods can be applied to any communication system. The system and methods can be applied to single and multicarrier configurations in both the uplink and downlink directions. The system and methods provide for automatically adjusting to changing conditions of interference and signal to noise ratio measurements. In another aspect, the subject inventions use of different frequency bands in multicarrier configurations provides for antenna feeder diplexing, providing twice as many transmit and receive paths per antenna feeder.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
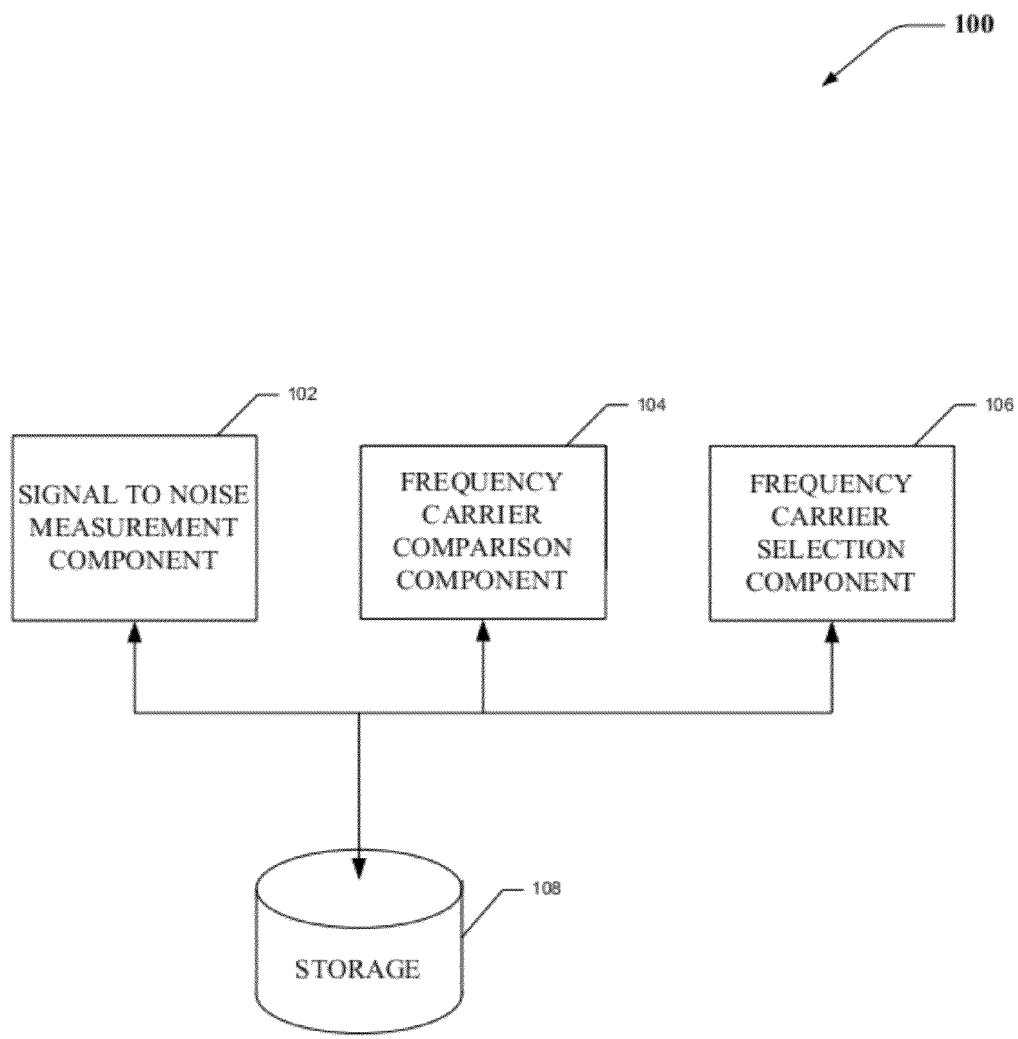
FIG. 1 illustrates a block diagram of an asymmetrical multicarrier interference avoidance system.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component," "system," "equipment," "interface", "network," and/or the like are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Asymmetrical multicarrier interference avoidance is an extension of an asymmetrical multicarrier transmission and reception technique and is specifically suited to avoid asymmetrical interference and link budget conditions. In this context, the term "asymmetrical interference" defines a condition where one direction of a bi-directional transmission path is impaired or blocked by interference from any number of sources. For example, another transmitter at or near the frequency of the interfered transmission path can create noise on the transmission path and degrade performance on the path to the point where reliable communications are not sustainable. In another example, FEMTO cell subscriber traffic can cause asymmetrical multicarrier interference by creating a much greater uplink interference to a macro LTE carrier, for example, than downlink interference from the access point. Under these circumstances, the macro LTE carrier can best be used for downlink only or at least downlink only as a first choice. Additionally, the term "asymmetrical link budget" defines a condition where one direction of a bi-directional transmission path has inadequate coverage in terms of signal strength and/or signal quality. For example, a difference in multiple access technique or interference mitigation technique used in each direction may result in significant differences in achievable coverage performance between the communication paths. In another example, the asymmetrical link budget can also be affected by fading and mobility conditions where one frequency band is more or less affected than another frequency band. The asymmetrical multicarrier interference avoidance system and methods provides for the efficient use of frequency carriers for which bi-directional transmission and reception is impaired or impossible due to the effects of asymmetrical interference or asymmetrical link budget.

Accomplishing the elements of the innovation requires the systems and methods described herein for three general tasks. First, the uplink and downlink interference is measured for all frequency carriers included in the asymmetrical multicarrier transmission and reception domain. Second, the uplink and downlink signal-to-noise ratio measurements are compared for all frequency carriers. Finally, the pairs of anchor and non-anchor frequency carriers are selected based upon the demand and their ability to deliver the desired signal-to-noise ratio in the desired direction of transmission. It should be noted that although this innovation is described in the context of a wireless communication, it is not so limited. The systems and methods described herein can be applied to other communication mediums such as a wired communication. It should also be noted that the systems and methods of this innovation can be applied to multicarrier operation in either the downlink or the uplink direction and any combination of single carrier or multicarrier in both the downlink and the uplink directions.

In addition to the foregoing, it should be appreciated that the claimed subject matter can be implemented as a method, apparatus, or article of manufacture using typical programming and/or engineering techniques to produce software, firmware, hardware, or any suitable combination thereof to control a computing device, such as a mobile handset, to implement the disclosed subject matter. The term "article of manufacture" as used herein is intended to encompass a computer program accessible from any suitable computer-readable device, media, or a carrier generated by such media/device. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave generated by a transmitter can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, the terms to "infer" or "inference", as used herein, refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring to the drawings, FIG. 1 depicts a block diagram of a sample system 100 for asymmetrical multicarrier interference avoidance. The asymmetrical multicarrier interference avoidance system 100 comprises a signal-to-noise measurement component 102, a frequency carrier comparison component 104, a frequency carrier pair selection component 106 and a storage component 108. The asymmetrical multicarrier interference avoidance system is implemented during frequency carrier assignment. In one aspect of the subject innovation, the signal-to-noise ratio measurement component 102 measures, and if necessary interpolates, the signal-to-noise ratio level at each end of a bi-directional frequency carrier pair. The measurement can be accomplished by any number of existing measurement techniques. In another aspect of the subject innovation, the frequency carrier comparison component 104 compares and ranks the frequency carriers based on the signal-to-noise ratio. The measurements are sorted and divided into separate tables for further processing. Another aspect of the subject innovation, the frequency carrier pair selection component 106, provides for selecting pairs of frequency carriers based on their desired function and rank from the previously created tables. The selection is a two stage process based on selecting an anchor and non-anchor frequency carrier pair. In another aspect of the subject innovation, a storage component 108 provides the ability to store data, including the previously described tables and measurements, and configuration information associated with the asymmetrical multicarrier interference avoidance system. The storage component 108 can be located either locally or remotely.

Figure 2:
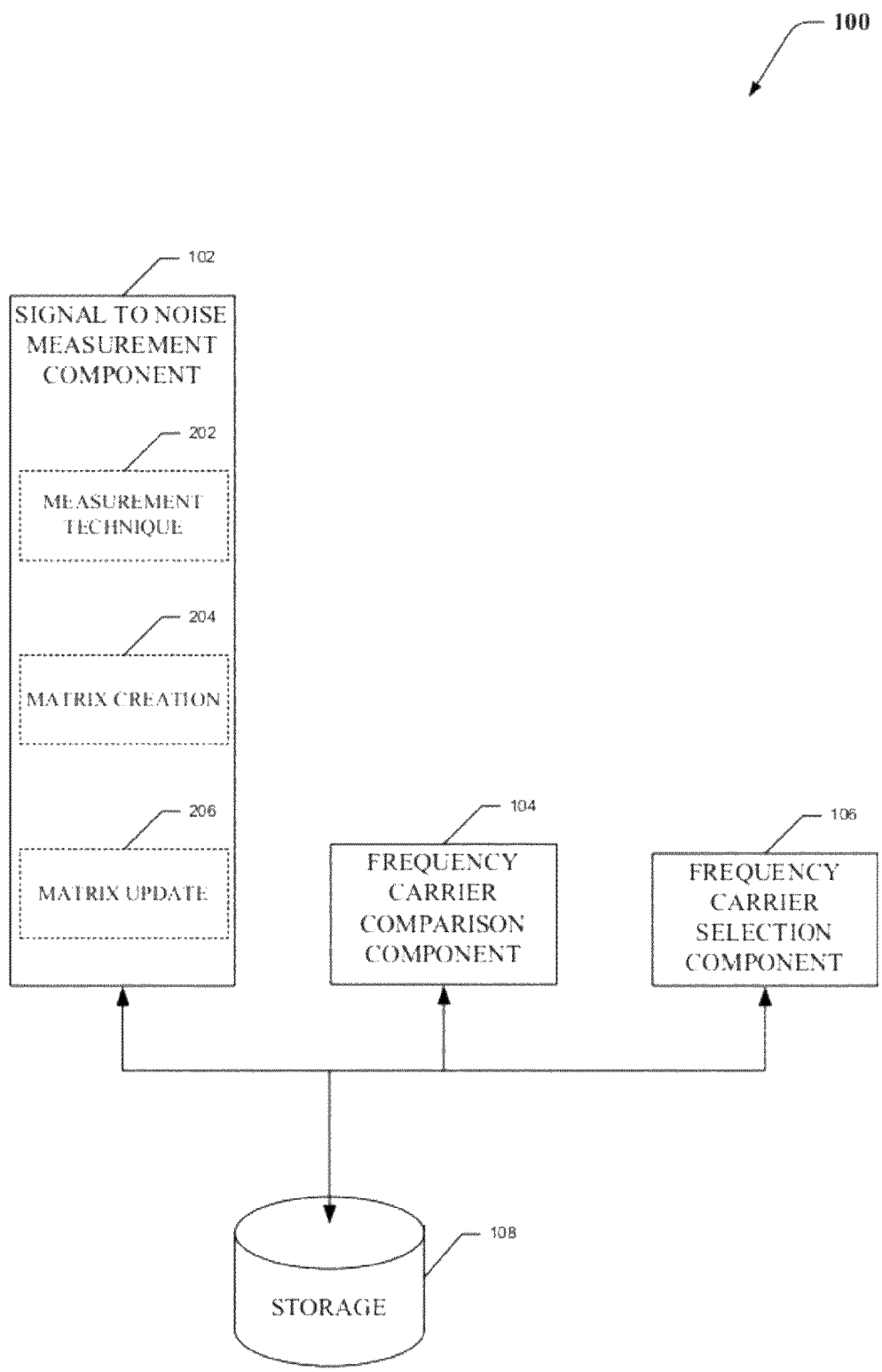
FIG. 2 illustrates a block diagram of an asymmetrical multicarrier interference avoidance system with respect to the sub-components of the signal-to-noise measurement component.

Referring again to the drawings, FIG. 2 depicts the sub-components of the signal-to-noise ratio measurement component 102 including a measurement technique selection component 202, a matrix creation component 204 and a matrix update component 206. In one aspect of the subject innovation, the measurement technique selection component 202 provides the ability to select from different techniques to measure the signal-to-noise ratio. The selection can be made manually or automatically based on the current network communications configuration and the availability of required measurement hardware. A variety of measurement techniques are available including for example dedicated scanning receivers, radio measurements during idle periods and interference interpolation using reported signal strength and quality samples.

In another aspect of the subject innovation, the matrix creation component 204 organizes the results of the series of measurements into a matrix of frequency carriers organized for ease of further evaluation. Each frequency carrier includes measurements for signal-to-noise ratio for the uplink and downlink signal. The matrix can be subdivided based on long term and short term trends and the history of application requirements and transmission technology. In another aspect of the subject innovation, the matrix update component 206 provides the ability to update the matrix based on changing conditions on the communications network or in the operational environment associated with the communications network. For example, obstructions creating interference in a given frequency carrier can appear, increase, diminish or disappear after an initial measurement and therefore require updating of the matrix as conditions change. In another aspect of the subject innovation, the measurement technique used for the initial measurement can be different than the measurement technique used for subsequent measurements. In this fashion, a broader understanding of the types and durations of interference associated with individual frequency carriers can be established and archived for optimizing the efficiency of the communications network.

Figure 3:
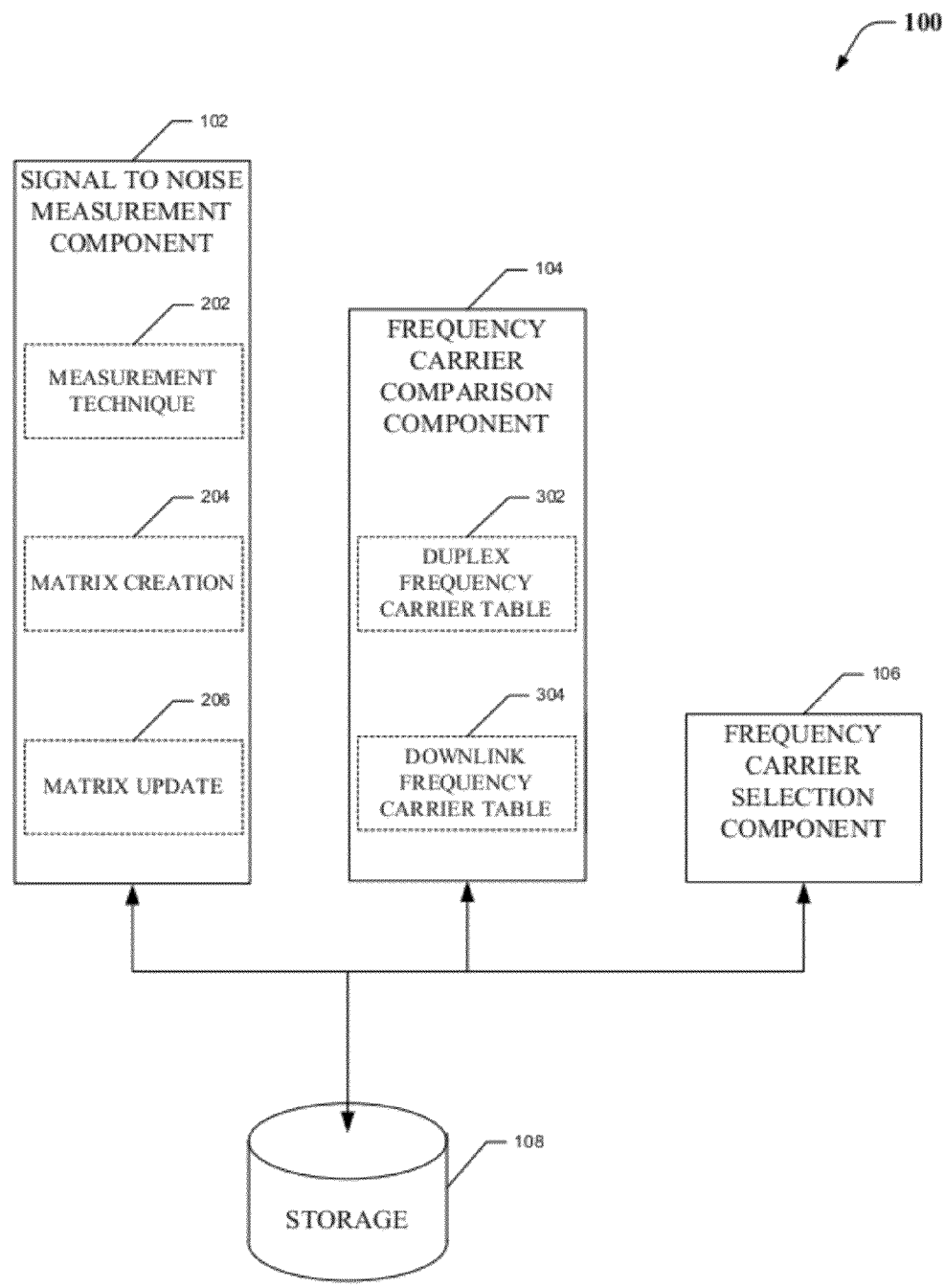
FIG. 3 illustrates a block diagram of an asymmetrical multicarrier interference avoidance system with respect to the sub-components of the frequency carrier pair comparison component.

FIG. 3 depicts the sub-components of the frequency carrier pair comparison component 104. The sub-components are a duplex frequency carrier table component 302 and a downlink frequency carrier table component 304. In one aspect of the subject innovation, the frequency carrier pair comparison component 104 divides and sorts the matrix created by the signal-to-noise ratio measurement component into the duplex frequency carrier table 302 and the downlink frequency carrier table 304.

In another aspect of the subject innovation, the duplex frequency carrier table 302 is sorted with all available frequency carrier pairs in descending order of combined signal-to-noise ratio for both uplink and downlink paths. In another aspect, the frequency carrier pair comparison component 104 can combine uplink and downlink signal-to-noise ratios using a variety of techniques based on either a manual or an automatic selection. For example, the signal-to-noise ratios can be combined by summing, averaging, threshold averaging (ignoring interference below predefined threshold values), weighted averaging and the like. Additionally, an alternative approach allows a sort in descending order of the worst, either uplink or downlink, signal-to-noise ratio for each frequency carrier pair. In some example configuration, frequency carrier pairs at the top of the list will have the highest overall uplink and downlink signal-to-noise ratio and are the best candidates for bi-directional transmission and reception.

The downlink frequency carrier table 304, in another aspect of the subject innovation sorts all available frequency carrier pairs in descending order of downlink/uplink signal-to-noise ratio. The frequency carrier pairs assigned to the top of this list possess the greatest difference between downlink and uplink signal-to-noise ratio. This sorting method will place frequency carrier pairs with the best downlink and worst uplink signal-to-noise ratios at the top of the list and the frequency carrier pairs with the worst downlink and best uplink signal-to-noise ratios at the bottom of the list.

Figure 4:
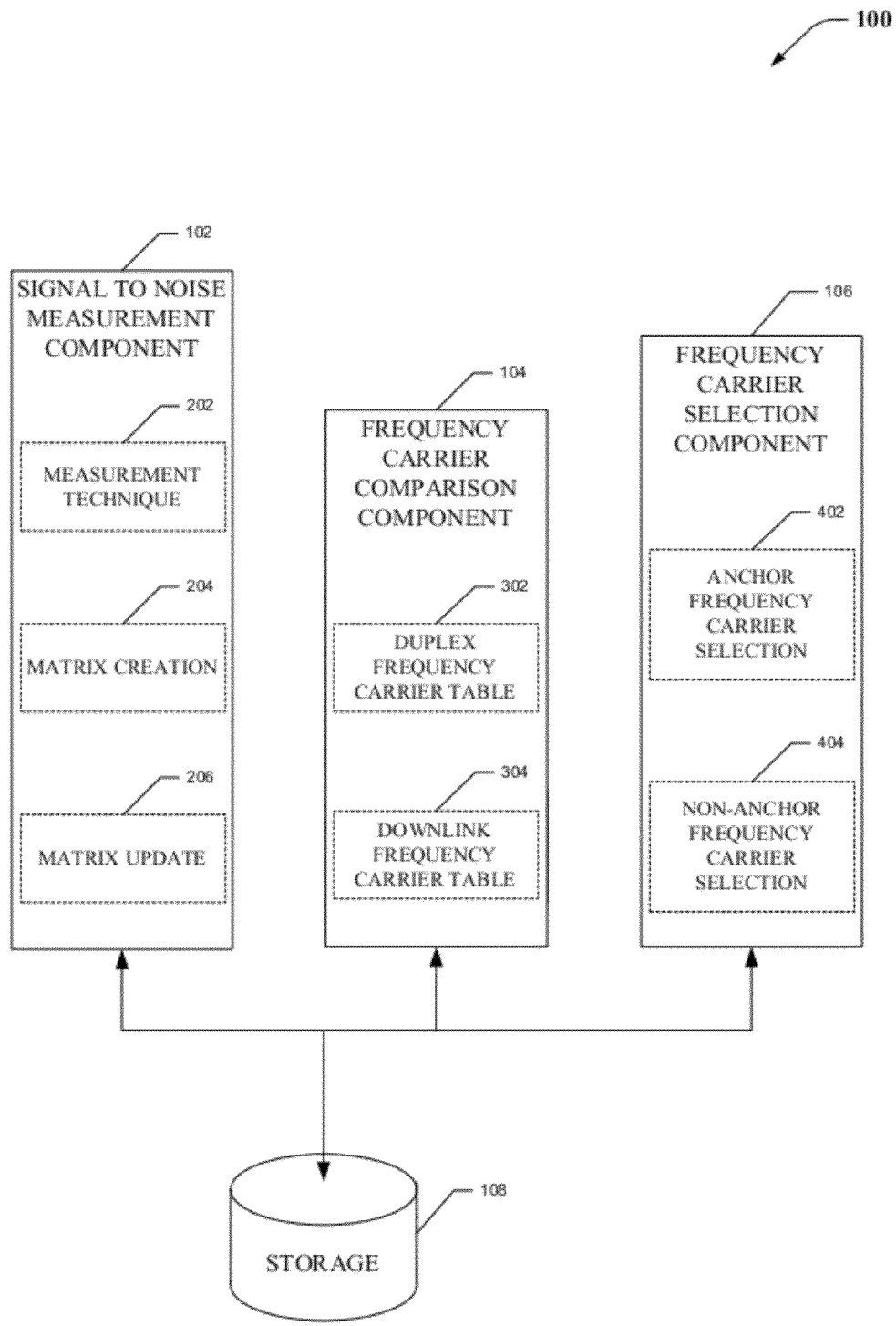
FIG. 4 illustrates a block diagram of an asymmetrical multicarrier interference avoidance system with respect to the sub-components of the frequency carrier pair selection component.

Referring again to the drawings, FIG. 4 depicts the sub-components of the frequency carrier pair selection component 106. The sub-components are the anchor frequency carrier pair selection component 402 and the non-anchor frequency carrier pair selection component 404. The frequency carrier pair selection component 106 selects frequency carriers in two stages based on their desired function and rank in the respective tables.

In one aspect of the subject innovation, the selected anchor frequency carrier pair must support both transmission and reception in the downlink and the uplink directions. The anchor frequency carrier pair is the primary signal connection between the communications network and the subscriber communication device. The anchor frequency carrier pair selection component 402 selects the anchor frequency carrier pair from the top of the duplex frequency carrier table 302 because the performance of the frequency carrier, and consequently the subscriber communication device, is dependent on the best downlink and uplink signal-to-noise ratio. It should be noted however that under circumstances such as the device having an extremely strong signal strength from the serving sector anchor frequency carrier pair and an extremely low signal strength from neighboring sector carriers, a less than best anchor frequency carrier pair can be selected therefore preserving the best available anchor frequency carrier pairs for devices in less optimal radio conditions.

In another aspect of the subject innovation, the non-anchor frequency carrier pair selection component 404 selects the non-anchor frequency carrier pair from the top of the downlink frequency carrier table 304. The non-anchor frequency carrier pairs are used in the multicarrier direction only and accordingly are selected to make the best use of frequency carrier pairs with asymmetrical signal-to-noise ratios. This selection process leaves the frequency carrier pairs with the best symmetrical signal-to-noise ratios available for anchor frequency carrier pair assignment. Similarly, it should be noted however that under circumstances such as the device having an extremely strong signal strength from the serving sector non-anchor frequency carrier pair and an extremely low signal strength from neighboring sector carriers, a less than best non-anchor frequency carrier pair can be selected therefore preserving the best available non-anchor frequency carrier pairs for devices in less optimal radio conditions.

Figure 5:
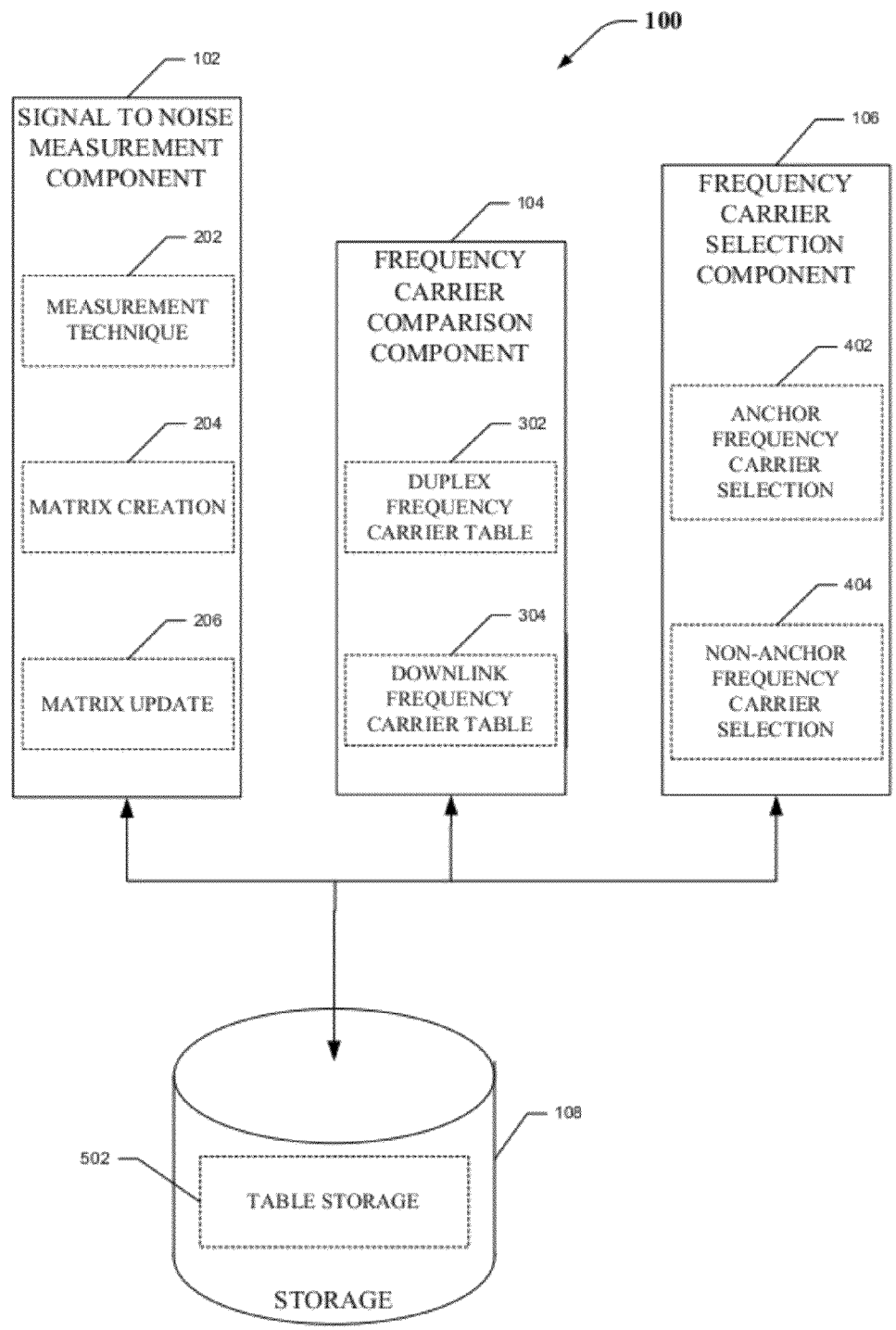
FIG. 5 illustrates a block diagram of an asymmetrical multicarrier interference avoidance system with respect to the sub-components of the storage component.

Referring now to the drawings, FIG. 5 depicts the sub-component of the storage component 108. The sub-component is the table storage component 502. The table storage component 502 provides persistent storage for frequency carrier tables, applications, services, reports and data collected concerning the operation of the network and the subscriber communication device. The data can be related to system efficiency, capacity, downtime, coverage area or any other information associated with the operation and efficiency of the communications network system.

Figure 6:
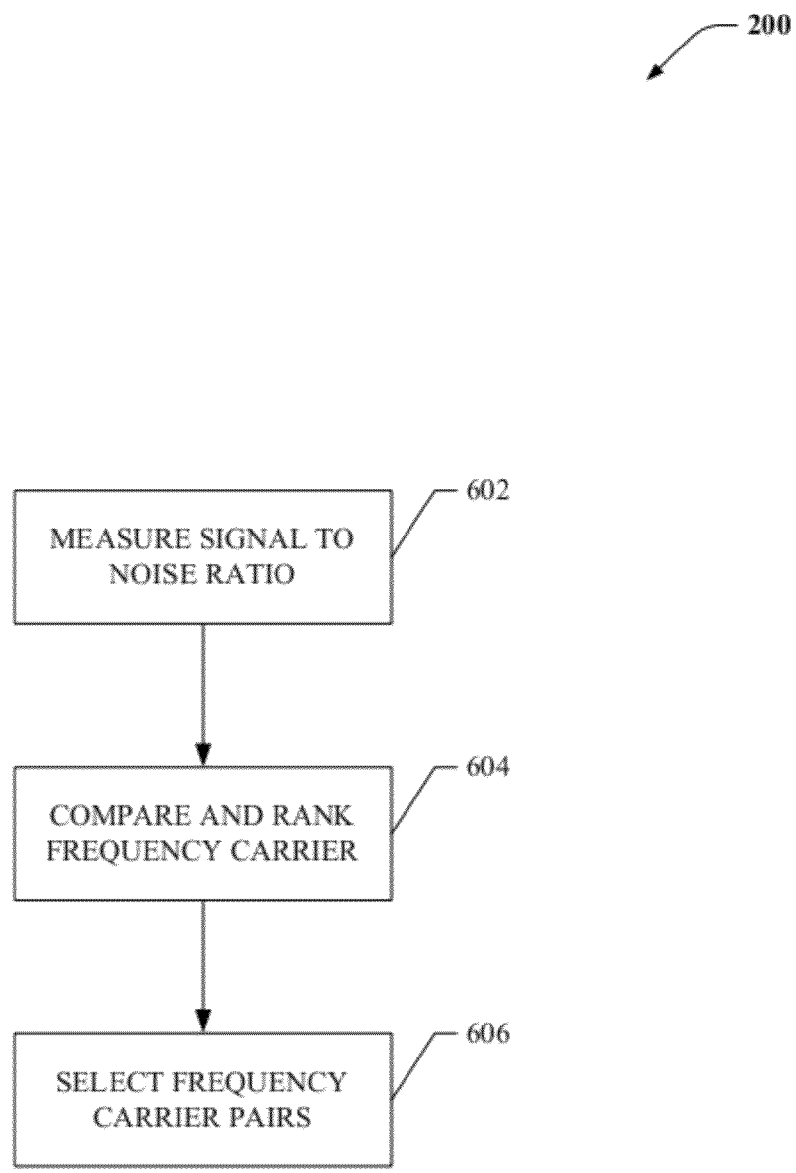
FIG. 6 illustrates a block diagram of an asymmetrical multicarrier interference avoidance method.

Referring again to the drawings, FIG. 6 depicts a flowchart method of identifying and selecting asymmetrical multicarrier interference avoidance frequency carrier pairs. At step 602, the asymmetrical multicarrier interference avoidance method 200 measures the signal-to-noise ratio for both uplink and downlink interference for all frequency carriers to be included for possible selection for transmission and reception. The measured values for each frequency carrier are retained for further processing and analysis. At step 604, the included frequency carriers are compared and ranked based on their signal-to-noise ratio values. Additionally, as a result of the ranking, tables are created to store the ranked frequency carrier pairs for selection based on the rankings. At step 606, the frequency carrier pairs are selected from the appropriate table based on their ranking and assigned to establish the network to subscriber communication device connection. The selected frequency carrier pairs are marked in the corresponding table as in use so the frequency carrier pair is not immediately selected again before the interference matrices are updated, either through measurement or interpolation, to account for the impact of the previous selection. As described previously, the ranking can be impacted by the circumstances associated with the device and its environment.

Figure 7:
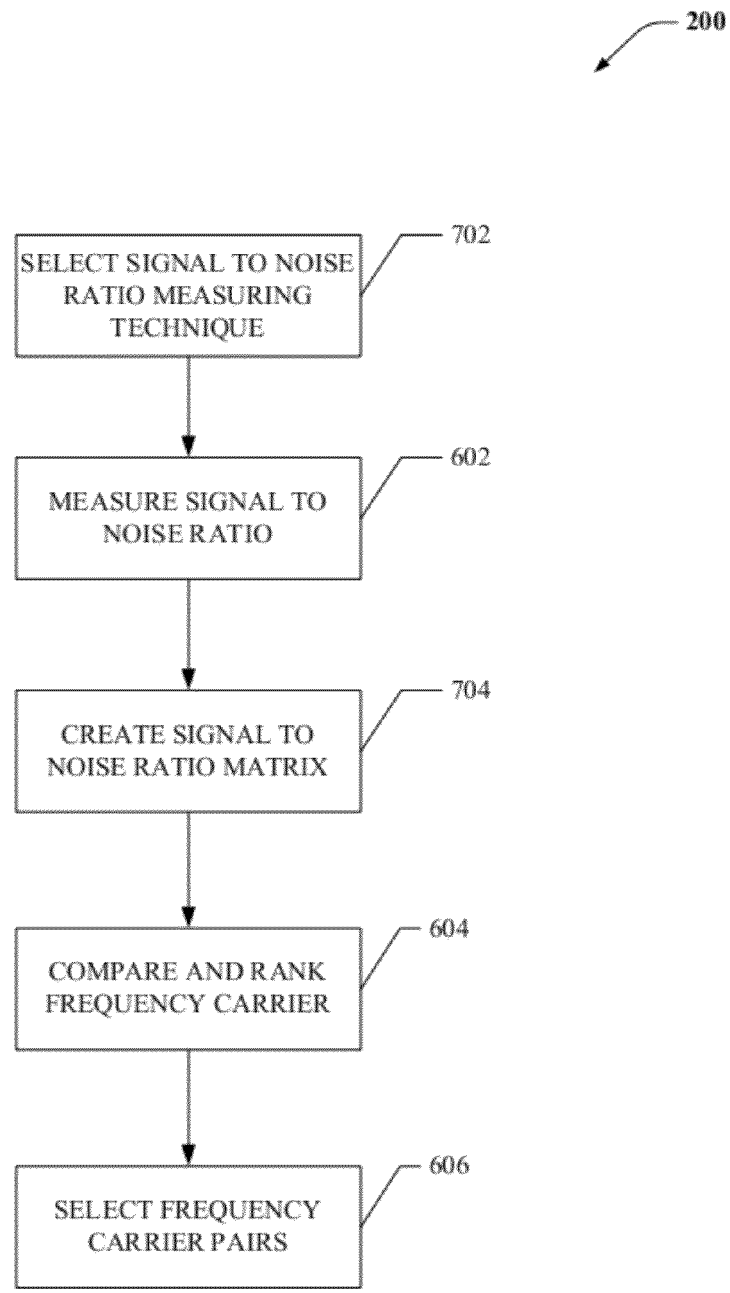
FIG. 7 illustrates a block diagram of an asymmetrical multicarrier interference avoidance method including the steps of selecting a signal-to-noise ratio measuring technique and creating the signal-to-noise ratio matrix.

Returning to the drawings, FIG. 7 depicts the flowchart method of identifying and selecting asymmetrical multicarrier interference avoidance frequency carrier pairs extended to select a signal-to-noise ratio measuring technique at 702 and creating a signal-to-noise ratio matrix at 704. At step 702, the asymmetrical multicarrier interference avoidance method 200 selects a signal-to-noise ratio measuring technique. The technique selected is dependent on the hardware and information available to the asymmetrical multicarrier interference avoidance method 200 and can be one of but not limited to dedicated scanning receivers, radio measurement during idle periods and interference interpolation using reported signal strength and quality samples. The selected technique is automatically selected by the asymmetrical multicarrier interference avoidance method 200 but can be manually changed by support personnel. Additionally, the asymmetrical multicarrier interference avoidance method 200 can automatically reevaluate circumstances and change the measurement technique based on changes in the network or in the subscriber communication device. At step 704, the asymmetrical multicarrier interference avoidance method 200 creates a signal-to-noise ratio matrix of all the frequency carriers currently available. Additionally, the asymmetrical multicarrier interference avoidance method 200 can automatically update the frequency carrier matrix based on changes to the network or the surrounding environment and adjust the frequency carrier pairs to reflect changes detected in the network or the surrounding environment and keep the network operating at peak efficiency with respect to frequency carrier utilization.

Figure 8:
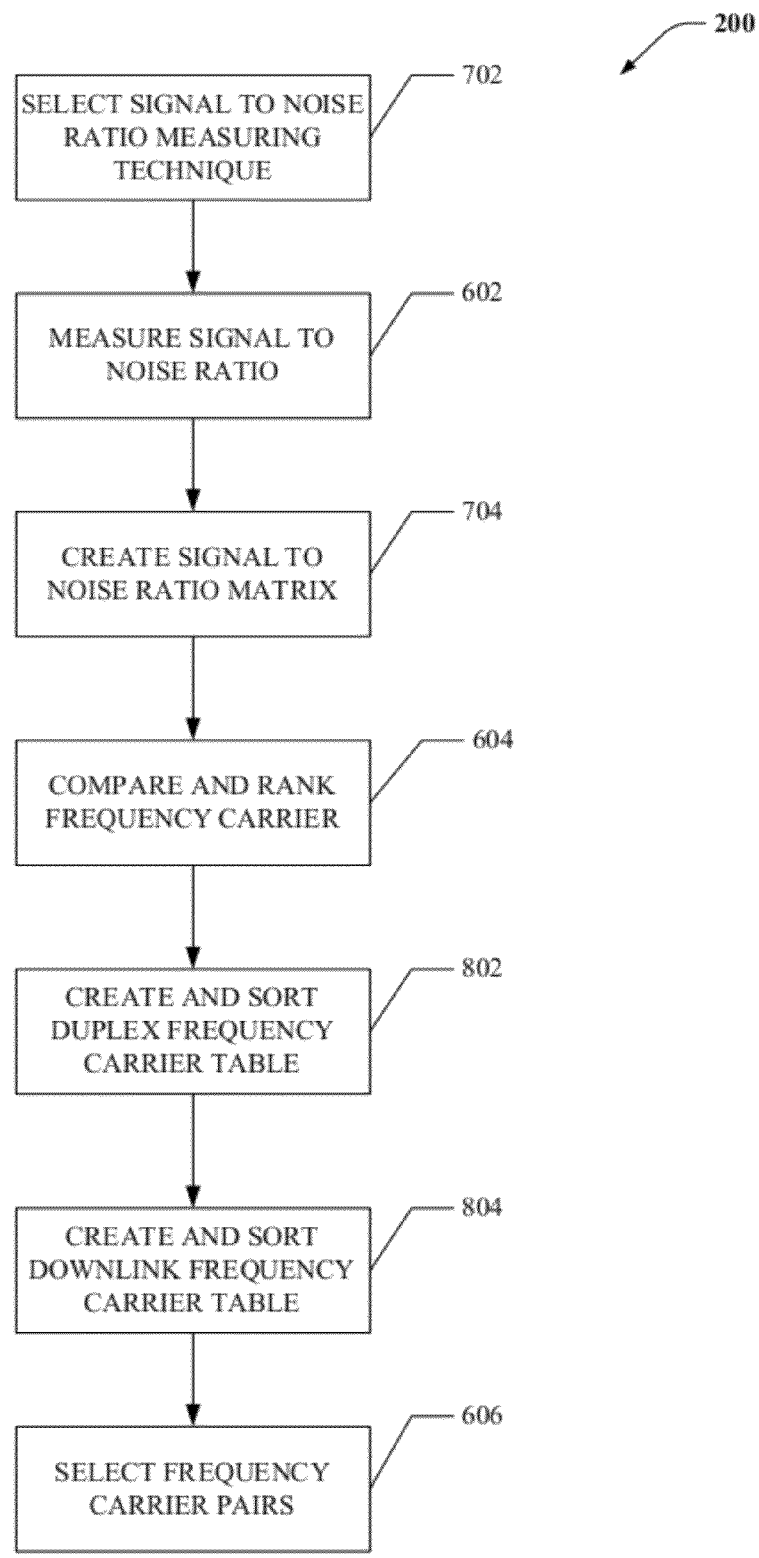
FIG. 8 illustrates a block diagram of an asymmetrical multicarrier interference avoidance method including the steps of creating and sorting the duplex frequency carrier table and the downlink frequency carrier table.

Referring again to the drawings, FIG. 8 depicts the flowchart method of identifying and selecting asymmetrical multicarrier interference avoidance frequency carriers extended to create and sort a duplex frequency carrier table at 802 and to create and sort a downlink frequency carrier table at 804. At step 802, the asymmetrical multicarrier interference avoidance method 200 creates a duplex frequency carrier table from the signal-to-noise ratio matrix of all the frequency carriers currently available. The duplex frequency carrier table is sorted in descending order of combined signal-to-noise ratio for both the downlink and uplink paths. Different techniques are available for performing the sort such as but not limited to summing, averaging, and threshold and weighted averaging. Frequency carrier pairs placed at the top of the duplex frequency carrier table have the highest overall combined downlink and uplink signal-to-noise ratio and are the best choices for bi-directional transmission and reception. At step 804, the asymmetrical multicarrier interference avoidance method 200 creates a downlink frequency carrier table from the signal-to-noise ratio matrix of all the frequency carriers currently available. The downlink frequency carrier table is sorted in descending order of the difference between the uplink and the downlink signal-to-noise ratios. This sort places frequency carrier pairs with the largest offset between downlink and uplink signal-to-noise ratios at the top of the table. Ideally, frequency carriers with the best downlink and worst uplink signal-to-noise ratios are placed at the top of the downlink frequency carrier table while frequency carriers with the worst downlink and best uplink signal-to-noise ratios are placed at the bottom of the downlink frequency carrier table.

Figure 9:
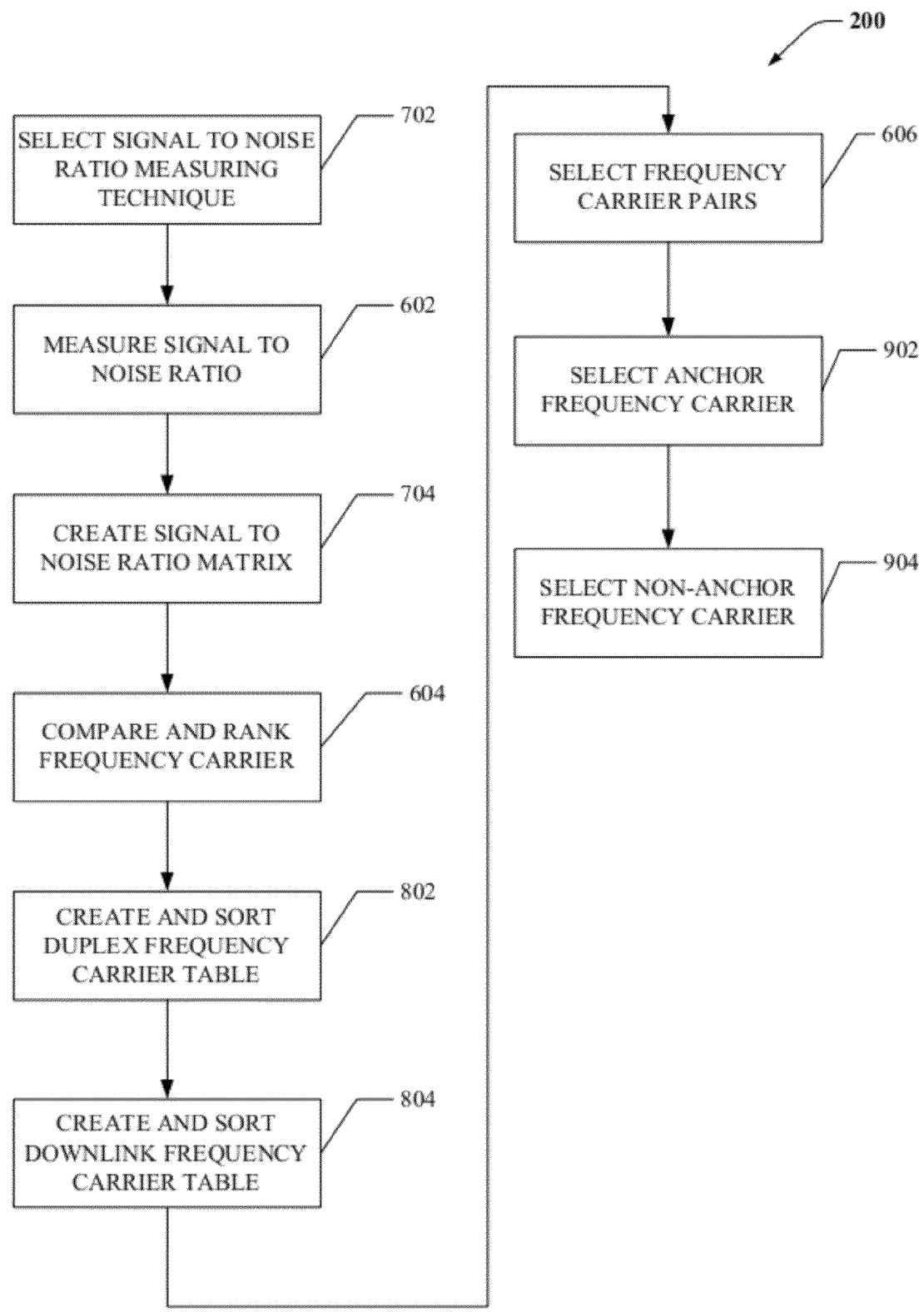
FIG. 9 illustrates a block diagram of an asymmetrical multicarrier interference avoidance method including the steps of selecting the anchor frequency carrier pair and the non-anchor frequency carrier pair.

Returning to the drawings, FIG. 9 depicts the flowchart method of identifying and selecting asymmetrical multicarrier interference avoidance frequency carrier pairs extended to select the anchor frequency carrier pair at 902 and to select the non-anchor frequency carrier pair at 904. In one aspect of the subject innovation illustrated at step 902, the asymmetrical multicarrier interference avoidance method 200 selects the anchor frequency carrier pair form the top of the duplex frequency carrier table 302. This selection must support transmission and reception in the uplink and downlink directions. This frequency carrier will be the primary communications connection between the network and the subscriber communication device and therefore requires the best uplink and downlink signal-to-noise ratio currently available. In another aspect of the subject innovation illustrated at step 904, the asymmetrical multicarrier interference avoidance method 200 selects the non-anchor frequency carrier pair from the top of the downlink frequency carrier table 304. The selected frequency carrier pair is only used in one multicarrier direction and may therefore be satisfied with a good asymmetrical signal-to-noise ratio.

Figure 10:
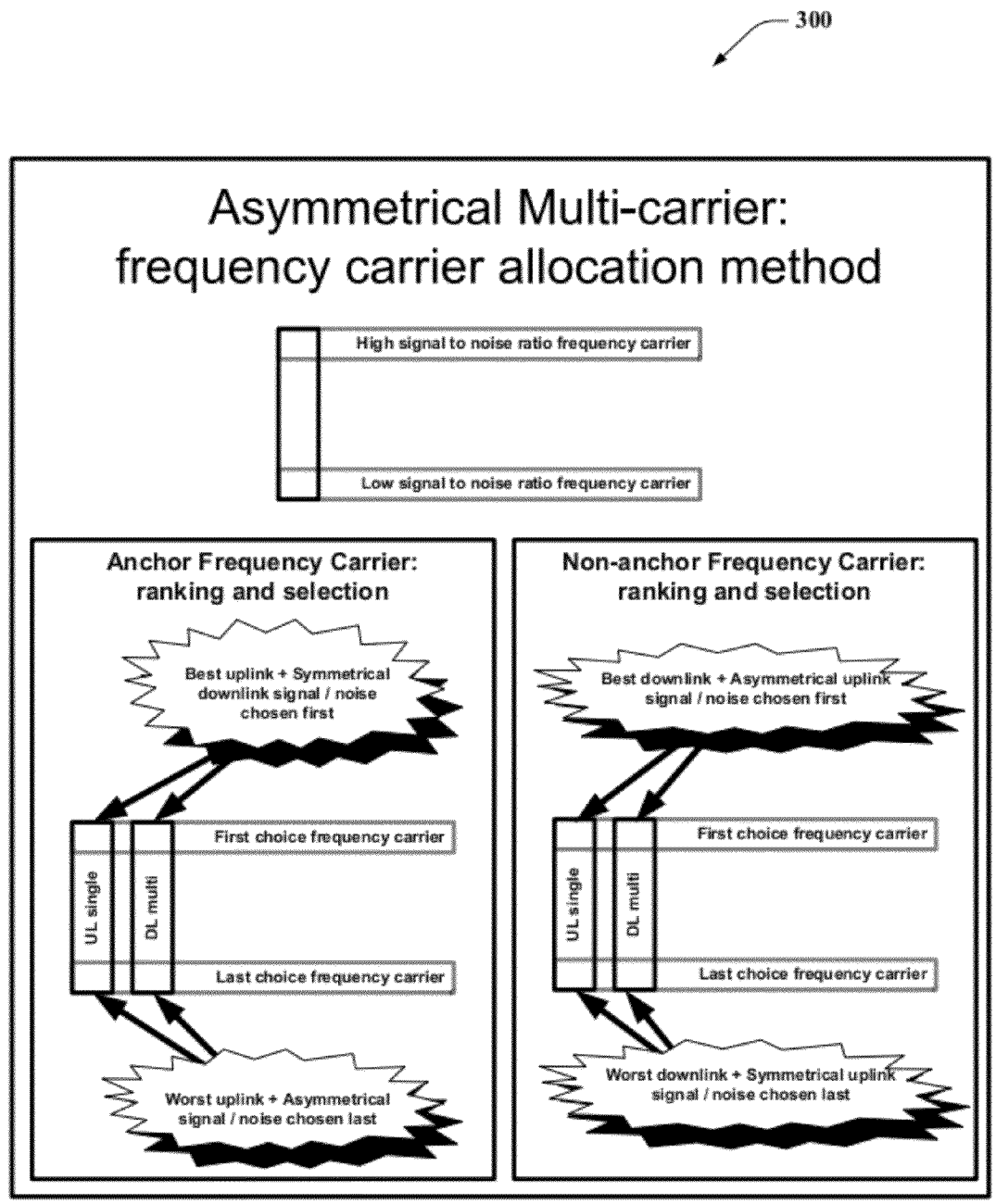
FIG. 10 illustrates a block diagram of an asymmetrical multicarrier interference avoidance method with respect to ranking and selecting the anchor frequency carrier pair and the non-anchor frequency carrier pair.

Referring again to the drawings, FIG. 10 depicts another representation of selecting the anchor and the non-anchor frequency carrier pairs. In one aspect, an anchor frequency carrier pair is selected from the duplex frequency carrier table 302 with the combination best uplink and symmetrical downlink signal-to-noise ratio chosen first. This selection results in choosing the frequency carrier pair at the top of the duplex frequency carrier table. As circumstances change the duplex frequency carrier table 302 can be updated with frequency carrier pairs becoming available exhibiting different signal-to-noise ratio values. In another aspect, a non-anchor frequency carrier pair is selected from the downlink frequency carrier table 304 with the combination best downlink and asymmetrical uplink signal-to-noise ratio chosen first. This selection results in choosing the frequency carrier pair at the top of the downlink frequency carrier table. As circumstances change the downlink frequency carrier table 304 can be updated with frequency carrier pairs becoming available exhibiting different signal-to-noise ratio values.

Figure 11:
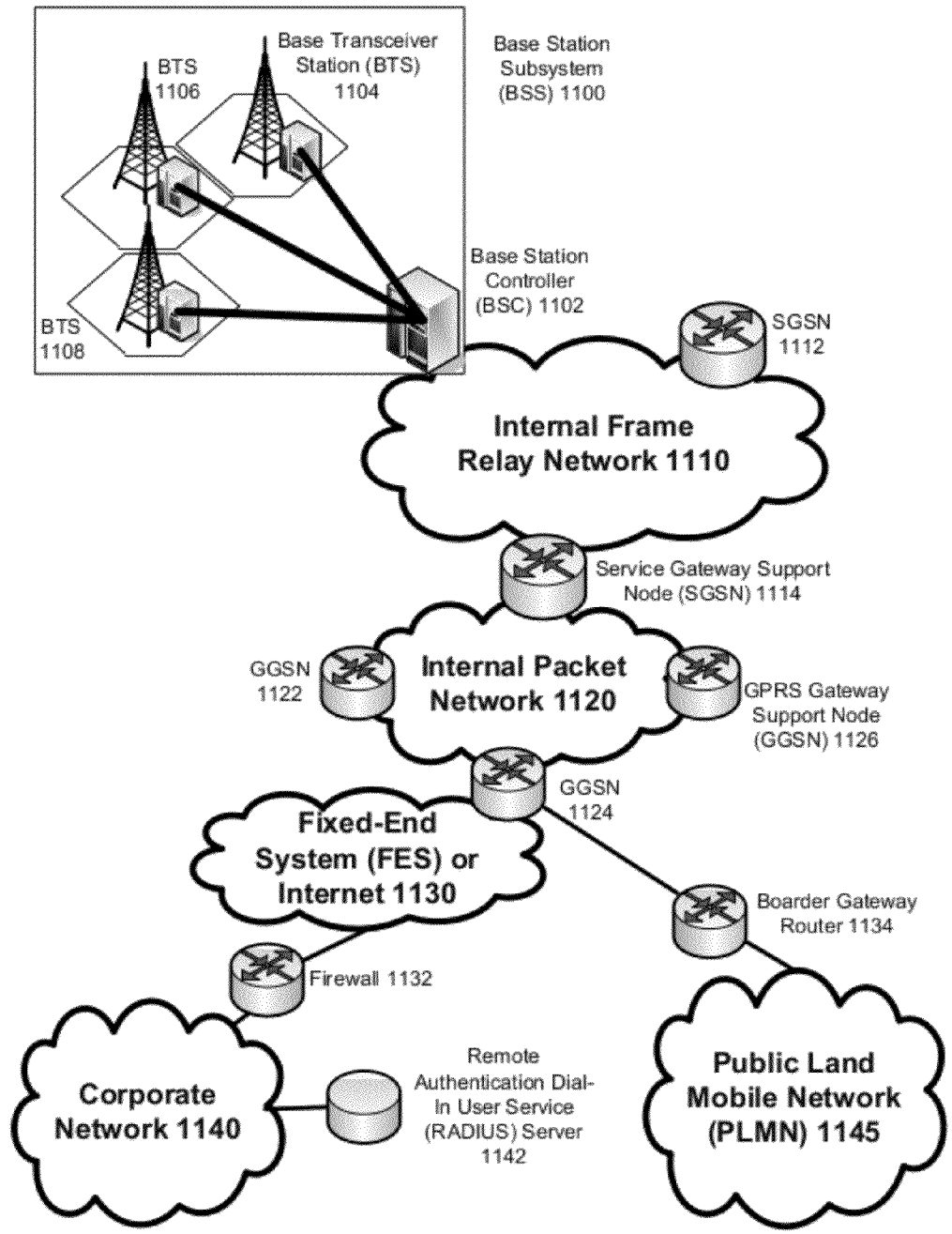
FIG. 11 illustrates an overview of an exemplary, non-limiting network environment suitable for service by various embodiments.

Returning to the drawings, FIG. 11 depicts an overall block diagram of an exemplary packet-based mobile cellular network environment, such as a GPRS network, in which the invention may be practiced. In such an environment, there are a plurality of Base Station Subsystems ("BSS") 1100 (only one is shown), each of which comprises a Base Station Controller ("BSC") 1102 serving a plurality of Base Transceiver Stations ("BTS") such as BTSs 1104, 1106, and 1108. BTSs 1104, 1106, 1108, etc. are the access points where users of packet-based mobile devices become connected to the wireless network. In exemplary fashion, the packet traffic originating from user devices is transported over the air interface to a BTS 1108, and from the BTS 1108 to the BSC 1102. Base station subsystems, such as BSS 1100, are a part of internal transport network 1110 that may include Service GPRS Support Nodes ("SGSN") such as SGSN 1112 and 1114. It should be noted that the invention can also be practiced in other 3G and beyond technologies including but not limited to Femto cell, wifi, wimax, etc.

Each SGSN is in turn connected to an internal packet network 1120 through which a SGSN 1112, 1114, etc. can route data packets to and from a plurality of gateway GPRS support nodes (GGSN) 1122, 1124, 1126, etc. As illustrated, SGSN 1114 and GGSNs 1122, 1124, and 1126 are part of internal packet network 1120. Gateway GPRS serving nodes 1122, 1124 and 1126 mainly provide an interface to external Internet Protocol ("IP") networks such as Public Land Mobile Network ("PLMN") 1145, corporate intranets 1140, or Fixed-End System ("FES") or the public Internet 1130. As illustrated, subscriber corporate network 1140 may be connected to GGSN 1124 via firewall 1132; and PLMN 1145 is connected to GGSN 1124 via boarder gateway router 1134. The Remote Authentication Dial-In User Service ("RADIUS") server 1142 may be used for caller authentication when a user of a mobile cellular device calls corporate network 1140.

Generally, there can be four different cell sizes in a wireless network—macro, micro, pico and umbrella cells. The coverage area of each cell is different in different environments. Macro cells can be regarded as cells where the base station antenna is installed in a mast or a building above average roof top level. Micro cells are cells whose antenna height is under average roof top level; they are typically used in urban areas. Pico cells are small cells having a diameter is a few dozen meters; they are mainly used indoors. On the other hand, umbrella cells are used to cover shadowed regions of smaller cells and fill in gaps in coverage between those cells.

Although not required, the claimed subject matter can partly be implemented via an operating system, for use by a developer of services for a device or object, and/or included within application software that operates in connection with one or more components of the claimed subject matter. Software may be described in the general context of computer-executable instructions, such as program modules, being executed by one or more computers, such as clients, servers, mobile devices, or other devices. Those skilled in the art will appreciate that the claimed subject matter can also be practiced with other computer system configurations and protocols, where non-limiting implementation details are given.

Figure 12:
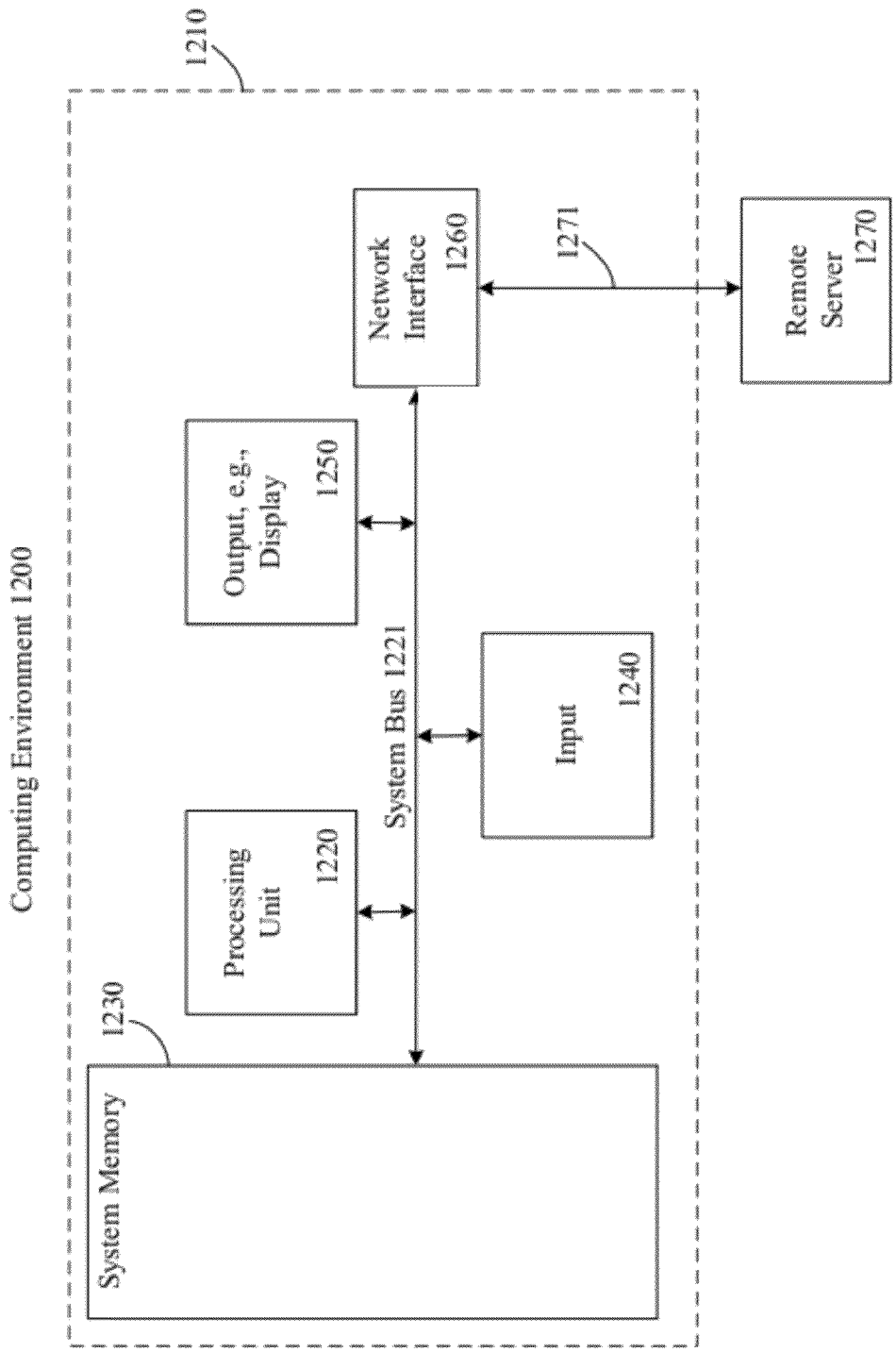
FIG. 12 illustrates a block diagram of an exemplary, non-limiting operating environment in which various aspects described herein can function.

Referring now to FIG. 12, there is illustrated a block diagram of a computer 1202 operable to provide networking and communication capabilities between a wired or wireless communication network and a server and/or communication device. In order to provide additional context for various aspects of the claimed subject matter, FIG. 12 and the following discussion are intended to provide a brief, general description of a suitable computing environment 300 in which the various aspects described herein can be implemented. While the description above is in the general context of computer-executable instructions that can run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Suitable combinations of the any of the above should also be included within the scope of communication media derived from computer-readable media and capable of subsequently propagating through electrically conductive media, (e.g., such as a system bus, microprocessor, data port, and the like) and/or non-electrically conductive media (e.g., in the form of radio frequency, microwave frequency, optical frequency and similar electromagnetic frequency modulated data signals).

With reference again to FIG. 12, the exemplary environment 300 for implementing various aspects includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors, such a single core processor, a multi-core processor, or any other suitable arrangement of processors. The system bus 1208 can be any of several types of bus structure that can further interconnect to a memory bus (with or without a memory controller), a peripheral bus, and a local bus using any of a variety of commercially available bus architectures. The system memory 1206 can include read-only memory (ROM), random access memory (RAM), high-speed RAM (such as static RAM), EPROM, EEPROM, and/or the like. Additionally or alternatively, the computer 1202 can include a hard disk drive, upon which program instructions, data, and the like can be retained. Moreover, removable data storage can be associated with the computer 1202. Hard disk drives, removable media, etc. can be communicatively coupled to the processing unit 1204 by way of the system bus 1208.

The system memory 1206 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the computer 1202 through one or more wired/wireless input devices, such as a keyboard, pointing and clicking mechanism, pressure sensitive screen, microphone, joystick, stylus pen, etc. A monitor or other type of interface can also be connected to the system bus 1208.

The computer 1202 can operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 902 can connect to other devices/networks by way of antenna, port, network interface adaptor, wireless access point, modem, and/or the like.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a tangible memory to store computer-executable instructions; and
   a processor, communicatively coupled to the tangible memory, that facilitates execution of the computer-executable instructions to perform operations comprising:
      determining difference values based on differences between uplink signal-to-noise ratios and downlink signal-to-noise ratios associated with respective frequency carrier pairs, and
      selecting a non-anchor frequency carrier from the respective frequency carrier pairs based in part on the difference values, wherein the selecting includes selecting the non-anchor frequency carrier based on a determination that a difference value corresponding to the non-anchor frequency carrier satisfies a predefined criterion.

2. The system of claim 1, wherein the operations further comprise utilizing the non-anchor frequency carrier to facilitate unidirectional communication between a communication network device and a user equipment.

3. The system of claim 2, wherein the non-anchor frequency carrier is selected based in part on a radio condition determined to be associated with the user equipment.

4. The system of claim 1, wherein the operations further comprise determining combined values of the uplink signal-to-noise ratios and the downlink signal-to-noise ratios of the respective frequency carrier pairs.

5. The system of claim 4, wherein the operations further comprise selecting an anchor frequency carrier from the respective frequency carrier pairs based in part on the combined values.

6. The system of claim 5, wherein the operations further comprise utilizing the anchor frequency carrier to facilitate bidirectional communication between a communication network device and a user equipment.

7. The system of claim 6, wherein the anchor frequency carrier is selected based in part on a radio condition determined to be associated with the user equipment.

8. The system of claim 1, wherein the operations further comprise determining the uplink signal-to-noise ratios and the downlink signal-to-noise ratios based in part on radio measurements performed during an idle mode of operation.

9. A method, comprising:
   determining, by a system comprising a processor, difference values based on differences between uplink signal-to-noise ratio data and downlink signal-to-noise ratio data associated with respective frequency carrier pairs; and
   identifying, by the system, a non-anchor frequency carrier from the respective frequency carrier pairs based in part on the difference values, wherein the identifying includes selecting as the non-anchor frequency carrier, a frequency carrier of the respective frequency carrier pairs associated with a difference value of the difference values, based on determining that the difference value satisfies a predefined criterion.

10. The method of claim 9, further comprising:
    determining, by the system, combined values of the uplink signal-to-noise ratio data and the downlink signal-to-noise ratio data; and
    identifying, by the system, an anchor frequency carrier from the respective frequency carrier pairs based in part on the combined values.

11. The method of claim 9, further comprising: measuring, by the system, the uplink signal-to-noise ratio data and the downlink signal-to-noise ratio data.

12. The method of claim 11, wherein the measuring is based in part on radio measurements performed during an idle mode of operation.

13. The method of claim 11, wherein the measuring is based in part on data identified by a set of dedicated scanning receivers.

14. The method of claim 11, wherein the measuring is based in part on an interpolation that employs a reported signal strength and a quality sample.

15. The method of claim 9, further comprising: receiving, by the system, selection data indicative of a signal-to-noise ratio measuring technique; and determining, by the system, the uplink signal-to-noise ratio data based on the selection data.

16. A tangible computer readable medium comprising computer-executable instructions that, in response to execution, cause a system including a processor to perform operations, comprising:
    determining difference values based on differences determined between uplink signal-to-noise ratios and downlink signal-to-noise ratios determined for frequency carrier pairs; and
    identifying a non-anchor frequency carrier from the frequency carrier pairs based in part on the difference values, wherein the identifying includes selecting the non-anchor frequency carrier from a subset of the frequency carrier pairs having corresponding difference values of the difference values that are determined to satisfy a predefined criterion.

17. The tangible computer readable medium of claim 16, wherein the operations further comprise: determining combined values of the uplink signal-to-noise ratios and the downlink signal-to-noise ratios; and selecting an anchor frequency carrier from the frequency carrier pairs based in part on the combined values.

18. The tangible computer readable medium of claim 17, wherein the selecting includes selecting the anchor frequency carrier from the a subset of the frequency carrier pairs having corresponding combined values of the combined values that are determined to satisfy a predefined criterion.

19. The tangible computer readable medium of claim 17, wherein the operations further comprise: assigning the anchor frequency carrier for a bidirectional communication between a user equipment and a communication network device; and assigning the non-anchor frequency carrier for a unidirectional communication between the user equipment and the communication network device.

20. The tangible computer readable medium of claim 16, wherein the uplink signal-to-noise ratios are determined based on selection data indicative of a signal-to-noise ratio measuring technique.

* * * * *